United States Patent [15] 3,704,046
Beacon [45] Nov. 28, 1972

[54] BRAKING MECHANISM
[72] Inventor: Robert G. Beacon, Sparta, N.J.
[73] Assignee: Ellcon-National, Inc., Totowa Borough, N.J.
[22] Filed: Sept. 25, 1970
[21] Appl. No.: 75,447

Related U.S. Application Data

[63] Continuation-in-part of Ser. No. 11,230, Feb. 13, 1970.

[52] U.S. Cl. ................................303/22 R, 188/195
[51] Int. Cl. ..............................................B60t 8/22
[58] Field of Search .188/195; 303/22 R, 22 A, 23 R, 303/23 A

[56] References Cited

UNITED STATES PATENTS 1,774,162  8/1930  Whitaker.................303/23 R
2,385,139  9/1945  Kelley.......................188/195

Primary Examiner—Duane A. Reger
Attorney—Ward, McElhannon, Brooks & Fitzpatrick

[57] ABSTRACT

A braking mechanism for a railway car including feeler appratus mounted on each side of a railway car body for indicating movement of the bolster with respect to the truck side frames, load compensating apparatus connected to the brake cylinder pipe for varying pressure of air in the brake cylinder, and equalizer apparatus for receiving vertical movement indications from the feeler apparatus and sending corresponding indications to the load compensating apparatus.

8 Claims, 3 Drawing Figures

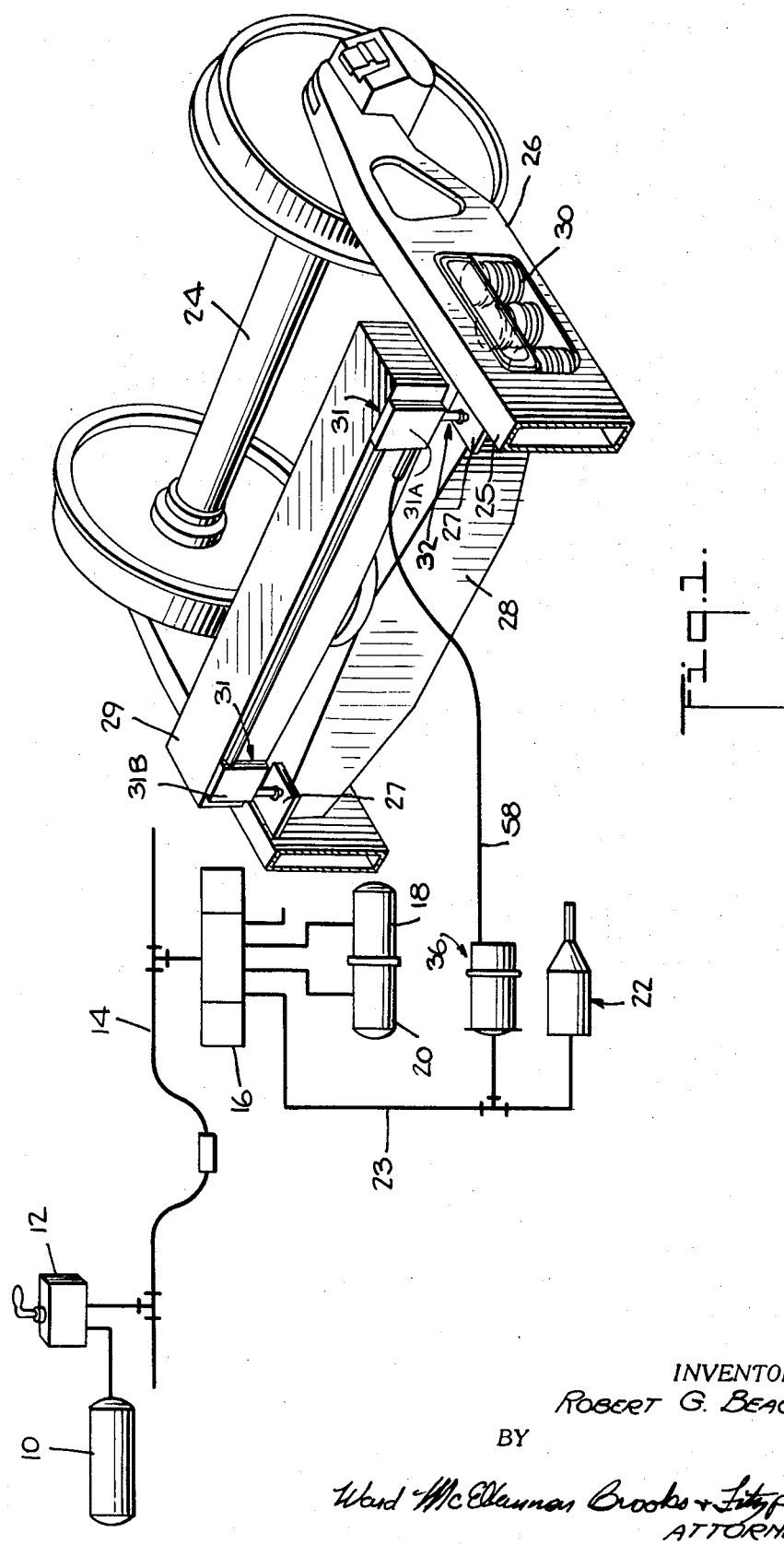

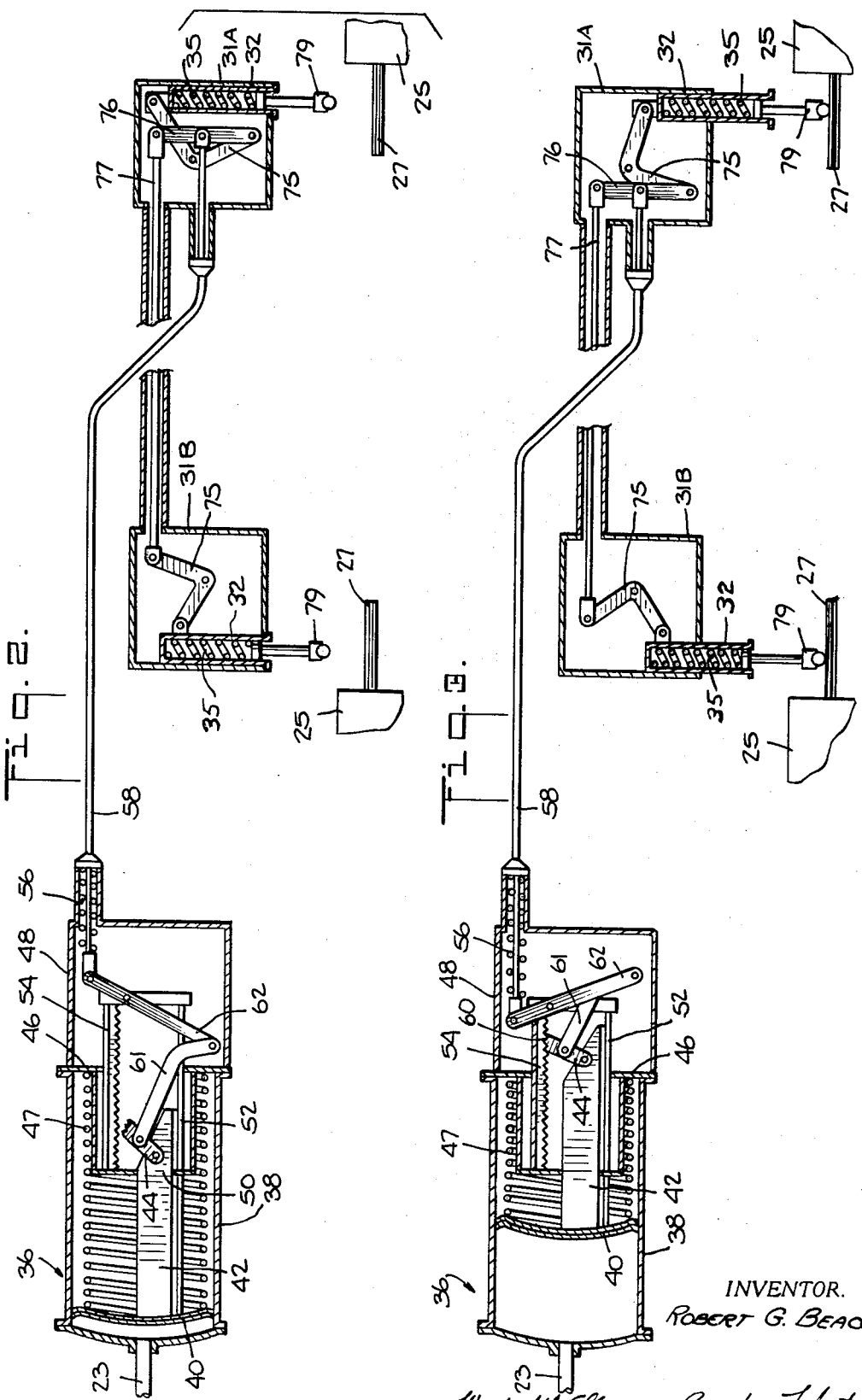

BRAKING MECHANISM

This application is a continuation-in-part application of my copending application Ser. No. 11,230, titled "Braking Apparatus," filed Feb. 13, 1970.

This invention relates to brake mechanisms, and more particularly to empty and load brake mechanisms for standard railway cars.

The Association of American Railroads and the Federal Railroad Administration specify the brake requirements for freight trains. All freight cars are equipped with an air brake system which must be compatible with every other car. Air pressure, under the control of the engineer, is applied to one or more brake cylinders on a freight car which directly, or through a lever system, applies the brake shoes to the wheels. The friction of the brake shoes against the wheel retards the turning of the wheel, thereby stopping the moving vehicle. However, the retarding force against the wheels must never exceed the friction force or adhesion between the wheel and the rail or the wheel will slide. Sliding results in a longer stopping distance and damage to the wheels and, hence, must be avoided. The maximum brake shoe force permissible is a function of the weight of the wheel on the rail. This weight differs substantially from when the railway car is empty to when the railway car is loaded and, generally, there is no provision on the car to change the brake shoe force to compensate for this change in weight. If the desired brake shoe force is applied for a loaded car then this force will cause sliding of the wheels when the car is empty. Thus, the empty car weight governs the maximum brake shoe force that can be applied. From experience this maximum force, expressed as a percentage of the weight of the car, is about 75 percent of the empty car weight. However, to meet minimum stopping requirements, this retarding force must also not be less than 18 percent of the maximum weight of the loaded car. These percentages are for cars equipped with cast iron brake shoes. When composition brake shoes are used, and they are becoming increasingly popular, the percentages are different because the coefficient of friction of the composition shoe is higher than that of the cast iron shoe, but the same problem exists.

The weight of the car when it is empty determines whether or not the proper braking ratios can be obtained. That is, the force that produces 75 percent of the empty weight must produce the minimum 18 percent of the loaded car weight. If the empty car weight is too low, compared to the loaded car weight, then the percentage of the loaded car weight will be under the minimum. Several arrangements have been used in this country in the past to overcome this problem. According to one arrangement, compensating dead weight was added to the empty car, but this was uneconomical. Another prior art arrangement utilized two brake cylinders. When the car was empty, air was supplied to one brake cylinder, and when the car was loaded, air was supplied to both brake cylinders, thereby increasing the brake shoe force. Still another arrangement employed a differential piston whereby air was applied to both sides of the piston when the car was in its empty condition, and when it was in its loaded condition, air was applied only to one side of the piston.

In the last two arrangements described above, the deflection of the car springs was used as a measure of the load being carried by the car. Some sort of measuring device was employed to indicate that the car springs were either extended for the empty car weight or compressed for the loaded car weight, and at some midposition between empty and loaded, the indicator would switch the brake from the empty mode to the loaded mode. The prior art methods were expensive to buy and costly to maintain. Related patents in this art include U.S. Pat. No. 1,230,949 issued June 26, 1917; U.S. Pat. No. 2,395,170 issued Feb. 19, 1946; U.S. Pat. No. 2,408,123 issued Sept. 24, 1946; U.S. Pat. No. 3,335,825 issued Aug. 15, 1967; and U.S. Pat. No. 3,338,640 issued Aug. 29, 1967.

The present invention involves a novel combination of features combined in such a way as to afford a very efficient solution to the difficulties encountered with the prior art, as will be apparent as the description proceeds.

In order to accomplish the desired results, this invention provides a new and improved brake mechanism for a railway car having a truck including side frames, pairs of wheels, a truck bolster resting on bolster springs contained in each truck side frame. The mechanism is characterized by a brake pipe, an air brake control valve connected to the brake pipe, and an auxiliary and an emergency reservoir connected to the control valve. In addition, there is a brake cylinder, a brake cylinder pipe connecting the brake control valve to the brake cylinder. Feeler means are mounted adjacent each side of the truck for indicating vertical travel of the bolster with respect to the truck side frame. A load compensating cylinder assembly is connected to the brake cylinder pipe. This assembly comprises a cylinder, a piston mounted in the cylinder, a T-bar having one end mounted on the piston, a pawl and rack means operatively connected to the T-bar and a lever drilled to a predetermined ratio. Also, there is provided equalizer means mounted in the feeler box for receiving vertical movement indications from each of the feeler means and sending one corresponding indication to the pawl means, thereby locking the piston in a position corresponding to the load of the railway car and, hence, regulating the volume and pressure in the brake cylinder.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which this disclosure is based, may readily be utilized as the basis for the designing of other structures for carrying out the several purposes of the invention. It is important, therefore, that this disclosure be regarded as including such equivalent constructions as do not depart from the spirit and scope of the invention.

One embodiment of the invention has been chosen for purposes of illustration and description, and is shown in the accompanying drawings, forming a part of the specification, wherein:

FIG. 1 is a perspective view, partially schematic, of a brake mechanism constructed according to the concept of this invention;

FIG. 2 is an enlarged side elevation of a load compensating cylinder, and feeler means in their brake released, car empty, positions; and FIG. 3 is an enlarged side elevation of the load compensating cylinder, and feeler means in their brake applied, car empty, positions;

When a train is made up at a terminal, the locomotive pumps air through a supply reservoir 10, FIG. 1, brake valve 12 and a pipe line extending through all of the cars in the train, known as the brake pipe 14. On each individual car, this brake pipe air enters an air brake control valve 16, pushes back a piston or spool valve, not shown, and fills a two compartment reservoir to a pressure equal to the brake pipe. One side of this reservoir is known as an auxiliary reservoir 18 which provides air pressure to the braking system of this car when a normal service application of the brakes is required. The other side is an emergency reservoir 20 which provides additional volume when an emergency application of the brake is initiated.

When the engineer applies the brakes from the locomotive, he exhausts air, thereby reducing the pressure in the brake pipe 14 which upsets the equilibrium of a service piston, not shown, located in the control valve 16 and makes a connection between the auxiliary reservoir 18 and a brake cylinder 22 via a brake cylinder pipe 23. Air will flow from the auxiliary reservoir to the brake cylinder until the auxiliary reservoir pressure equals that of the brake pipe, at which time the valve closes, thereby cutting off all connections.

In order to release the brakes, the engineer again charges the brake pipe 14, and when the pressure rises above that of the auxiliary reservoir 18, the service piston in the control valve 16 will make connections, whereby the brake pipe again charges the auxiliary reservoir 18 while the brake cylinder 22 becomes connected to exhaust.

The auxiliary reservoir air which passes to the brake cylinder 22 during application of the brakes builds up a pressure on the face of the brake cylinder piston and transmits a force through an arrangement of levers and rods (not shown) to apply friction shoes to the treads of the wheels (not shown). The force of the brake shoes on the wheels increases in direct proportion to the brake cylinder pressure developed, and governs the amount of retardation in proportion to the amount of the friction force developed and the weight of the car being decelerated. This retarding force must not exceed the adhesion of the wheel to the rail or the wheel will skid, resulting in flat spots on the wheel tread which is objectionable and expensive to repair.

The amount of air pressure developed in the brake cylinder is in direct proportion to the amount of brake pipe air exhausted by the engineer, until equalization between the pressures in the auxiliary reservoir 18 and the brake cylinder 22 occurs. Any further reduction of the brake pipe air will have no effect. An emergency application will, however, develop approximately 20 percent more brake cylinder pressure than a full service application.

The lever ratio in the brake rigging is normally designed to obtain the maximum friction force that can be used on an empty car according to governing authorities. This force is usually inadequate for a fully loaded car, and according to this invention means are provided to increase this force.

As best seen in FIG. 1, railway freight cars are supported on two or more trucks comprising two or more wheel sets 24 attached together by truck side frames 26 and bearing arrangements. These side frames are unsprung members resting on the axle on each side of the truck. Tying these truck side frames together is one or more truck bolsters 28 resting on bolster springs 30 contained in each truck side frame and supporting the car body in the center.

As the weight of the railway car increases, the bolster springs 30 deflect proportionately, to bring the car body 29 and truck side frames 26 nearer each other on both sides of the truck. Each spring set has a preselected travel and the amount of spring travel is directly proportional to the weight of the car and its contents, if any. Feeler means, indicated generally at 31, are mounted on each side of the car body in feeler boxes 31A and 31B for purposes of indicating the vertical travel of the car body with respect to the truck side frames 26. Said feeler means include tubes, levers and rods enclosed in boxes on each side of the car body.

Plates 27, may be attached to the truck side frames to stop said feeler means, or the top surface 25, of the truck side frames, may be used directly for this purpose. By this means, the weight of the car is transformed into linear movement which is used to control the amount of the brake force as will be pointed out more fully hereinafter.

A load compensating cylinder assembly, indicated generally at 36, is tied into the existing brake cylinder pipe 23 on the railway car. As best seen in FIGS. 2 and 2, this assembly comprises a cylinder 38, a piston 40 mounted in said cylinder, a T-bar 42 having one end mounted on said piston and a pawl 44 pivotally mounted on the other end thereof. The cylinder 38 has an end wall 46 and a return spring 47 interposed between the end wall and the piston 40 for returning the piston to its lefthand position, as viewed in FIGS. 2 and 3. The end wall 46 carries housing 48 for the pawl 44 and ratio lever 62. The housing has an opening 50 in the end adjacent the piston 40 for the passage of the T-bar 42. Also, the housing has a lower guide assembly 52 for guiding the movement of the T-bar. A rack 54 is mounted on the housing 48 for receiving the pawl 44. Said pawl is attached to a ratio lever 62 by a pawl bar 61. The purpose of the ratio lever 62 is to convert the relatively short feeler travel to the longer travel of the piston 40 in a direct ratio to the feeler travel. A pawl spring 56 is at one end of the ratio lever 62 for urging said pawl out of engagement with said rack 54.

A sheathed cable 58 is attached to the end of the ratio lever 62 for purposes of urging the pawl into engagement with the rack 54, as shown at 60, FIG. 3.

The other end of the cable 58 is connected to a medial portion of an equalizer bar 76 located in the primary feeler box 31A for purposes of obtaining the average travel of feeler tubes 32 mounted in feeler boxes 31A and 31B on each side of the railway car, respectively.

As viewed in FIG. 3, in operation when the brakes are applied, the brake cylinder air enters the load compensating cylinder assembly 36 from the brake cylinder pipe 23 and applies pressure against the face of the piston 40. The spring 47 holds back movement of the piston until a force equal to the compression of the spring is built up. This is necessary to insure that every brake application, regardless of the amount of brake cylinder pressure buildup, is transmitted to the brake shoes. When the spring force is overcome, the piston 40 will move to the right, as viewed in FIG. 3, pushing the pawl 44 therewith as it is being held out of engagement with the rack 54 by means of the spring 56. The pawl pushes the bottom of the ratio lever 62 to the right, as viewed in FIG. 3, and as it is pivoted at a predetermined point, pulls the sheathed cable from the primary feeler box 31A. This movement, in turn, moves the equalizing lever 76 and the feeler lever 75 and rod 77, pushing the tubes 32 in the feeler boxes 31A and 31B down until end members 79 strike the truck side frames at 25, or plates 27. When the end members 79 strike the plates 27, further movement of the ratio lever 62 is prevented and additional movement of the piston 40 rotates the pawl into engagement with the rack 54 to lock the piston 40 against further movement. This has the result of allowing the piston 40 to travel to the right, as viewed in FIG. 3, a distance proportional to the movement of the feeler means 31 which corresponds to the weight of the railway car. Accordingly, a fully loaded railway car will have little volume in the cylinder 38 while an empty car will have a preselected larger volume which is equivalent to the full travel required for that particular series of freight cars. The volume in the cylinder 38 in effect creates a reservoir which increases the amount of space to be filled by the volume of air from the auxiliary reservoir 18, FIG. 1. The result is a preselected pressure in the brake cylinder 22 and a corresponding force transmitted to the brake shoes through the brake rigging.

When the train brakes are released, as viewed in FIG. 2, the air pressure exhausts from the front of the piston 40 and a return spring 47 pushes the piston 40 back to its release position pulling the entire mechanism along with it. Accordingly, the movement of the feeler means will determine the volume in the cylinder for each brake application.

The equalizer bar 76 in the primary feeler box 31A insures that a true feeler travel is fed to the ratio lever 62. If a car is loaded off-center or the brake application is initiated when the car is tipped to one side as when going around a curve, one feeler will have a long travel, while the other will have a short travel and the average of these two travels will be transmitted by the tipping motion of the equalizer bar, thereby providing a true reading. If a car is rocking from side to side as it goes down the track, this side motion will be taken up by the equalizer bar and will eliminate false readings which might otherwise be obtained. Each feeler tube 32 contains an overtravel spring arrangement 35 to protect the mechanism from undue force if the car is loaded with the mechanism engaged.

It will thus be seen that the present invention does indeed provide an improved braking system which is superior in simplicity, economy and efficiency as compared to prior art such devices.

Although a particular embodiment of the invention is herein disclosed for purposes of explanation, various modification thereof, after study of this specification, will be apparent to those skilled in the art to which the invention pertains.

What is claimed and desired to be secured by Letters Patent is:

1. A braking mechanism for a railway car having a truck including side frames, pairs of wheels, a truck bolster resting on bolster springs contained in each truck side frame and a car body carried by said truck bolster, said mechanism comprising a brake pipe, and an air brake control valve connected to said brake pipe, an auxiliary reservoir connected to said control valve and an emergency reservoir connected to said control valve, a brake cylinder, a brake cylinder pipe connecting said air brake control valve to said brake cylinder, feeler means mounted in a feeler box on each side of the car body adjacent said truck for indicating vertical travel of the bolster with respect to said truck side frames, a load compensating cylinder assembly connected to said brake cylinder pipe, said assembly comprising a cylinder, a piston mounted in said cylinder, a T-bar having one end mounted on said piston, pawl and rack means operatively connected to said T-bar, equalizer means mounted in one of said feeler boxes for receiving vertical movement indications from each of said feeler means and sending a corresponding indication to said pawl means.

2. A braking mechanism according to claim 1 wherein each of said feeler means comprises a feeler tube containing a stiff spring, said tube having an end member extending outwardly, said end member being mounted adjacent the truck side frame for movement proportional to the weight of said railway car.

3. A braking mechanism according to claim 2 wherein said equalizer means comprises an equalizer bar mounted in one of said feeler boxes, linkage means connected to the outer ends of said equalizer bar to said feeler tubes, means connecting the mid-portion of said equalizer bar to the pawl in the load compensating cylinder assembly.

4. A braking mechanism according to claim 1 wherein said feeler means and said equalizer means comprise an equalizer bar mounted in said one of the feeler boxes, means operatively connecting said equalizer bar to said pawl and rack means, a first feeler lever connected to said equalizer bar, a member extending outwardly of said feeler box adjacent one of the truck side frames for movement proportional to the weight of said railway car, means connecting said member to said first feeler lever, a second feeler lever mounted in the other of said feeler boxes, a rod connecting said second feeler lever to said equalizer bar, a second member extending outwardly of said other feeler box adjacent the other of the truck side frames for movement proportional to the weight of said railway car, and means connecting said second member to said second feeler lever.

5. A braking mechanism according to claim 1 wherein said load compensating cylinder assembly comprises a pawl pivotally mounted on said T-bar, said cylinder having an end wall, a return spring interposed between said end wall and said piston, a housing carried by said end wall, said housing having a rack mounted thereon for receiving said pawl, a ratio lever, a pawl bar connecting said pawl to said ratio lever, a sheathed cable having one end attached to said ratio lever for urging said pawl into engagement with said rack, the other end of said cable being attached to said equalizer means, a pawl spring connected to said ratio lever for urging said pawl out of engagement with said rack.

6. A braking mechanism according to claim 5 wherein said compensating cylinder assembly further comprises an opening in the end adjacent said piston for the passage of said T-bar, and lower guide means in said housing for guiding the movement of said T-bar.

7. A braking mechanism according to claim 1 wherein said equalizer means comprises an equalizer bar, and said load compensating cylinder assembly comprises ratio lever means connected to said pawl and rack means, cable means connecting said equalizer bar with said ratio lever means, and said feeler means being connected to said equalizer bar.

8. A braking mechanism for a railway car having a truck including side frames, pairs of wheels, a truck bolster resting on bolster springs contained in each truck side frame and a car body carried by said truck bolster, said mechanism comprising a brake pipe, an air brake control valve connected to said brake pipe, an auxiliary reservoir connected to said control valve, an emergency reservoir connected to said control valve, a brake cylinder, a brake cylinder pipe connecting said air brake control valve to said brake cylinder, feeler means mounted in a feeler box on each side of the car body adjacent said truck for indicating vertical travel of the bolster with respect to said truck side frames, each of said feeler means comprising a feeler tube containing a stiff spring, said tube having an end member extending outwardly, said end member being mounted adjacent the truck side frame for movement proportional to the weight of said railway car, a load compensating cylinder assembly connected to said brake cylinder pipe, said load compensating cylinder assembly comprising a cylinder, a piston mounted in said cylinder, a T-bar having one end mounted on said piston and a pawl pivotally mounted on the other end thereof, said cylinder having an end wall, a return spring interposed between said end wall and said piston, a pawl housing carried by said end wall, said housing having an opening in the end adjacent said piston for the passage of said T-bar, said housing having lower guide means for guiding the movement of said T-bar, a rack mounted on said housing for receiving said pawl, a ratio lever, a pawl bar connecting said pawl to said ratio lever, a pawl spring connected to said ratio lever for urging said pawl out of engagement with said rack, a sheathed cable having one end attached to said ratio lever for urging said pawl into engagement with the rack, an equalizer bar mounted in one of said feeler boxes, the other end of said sheathed cable being attached to said equalizer bar, a first feeler lever connected to said equalizer bar in said one feeler box, one of said feeler tubes being connected to said first feeler lever, a second feeler lever mounted in the other of said feeler boxes, the other of said feeler tubes being connected to said second feeler lever, and a rod connecting said second feeler lever to said equalizer bar.

* * * * *